Patented Dec. 10, 1929

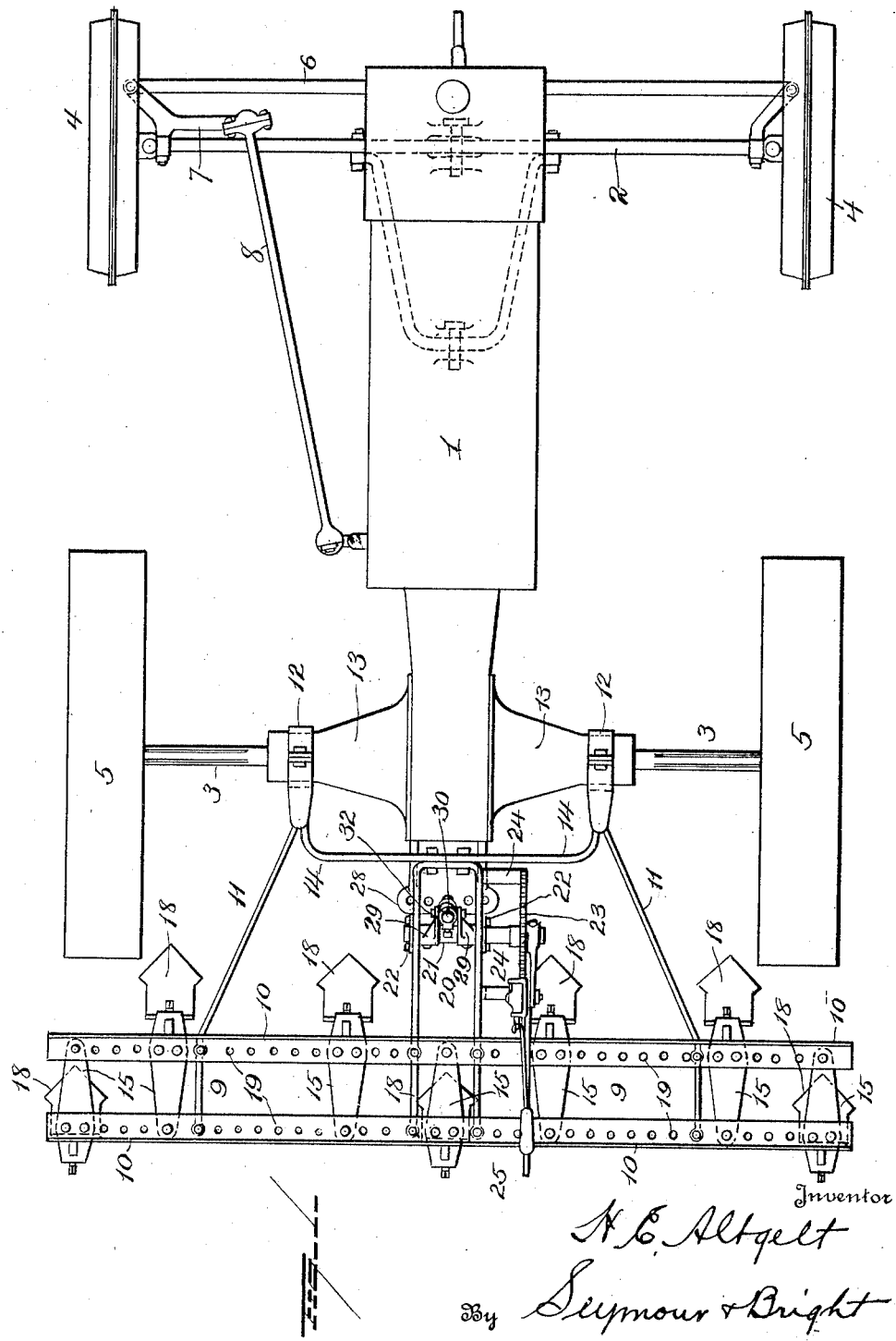

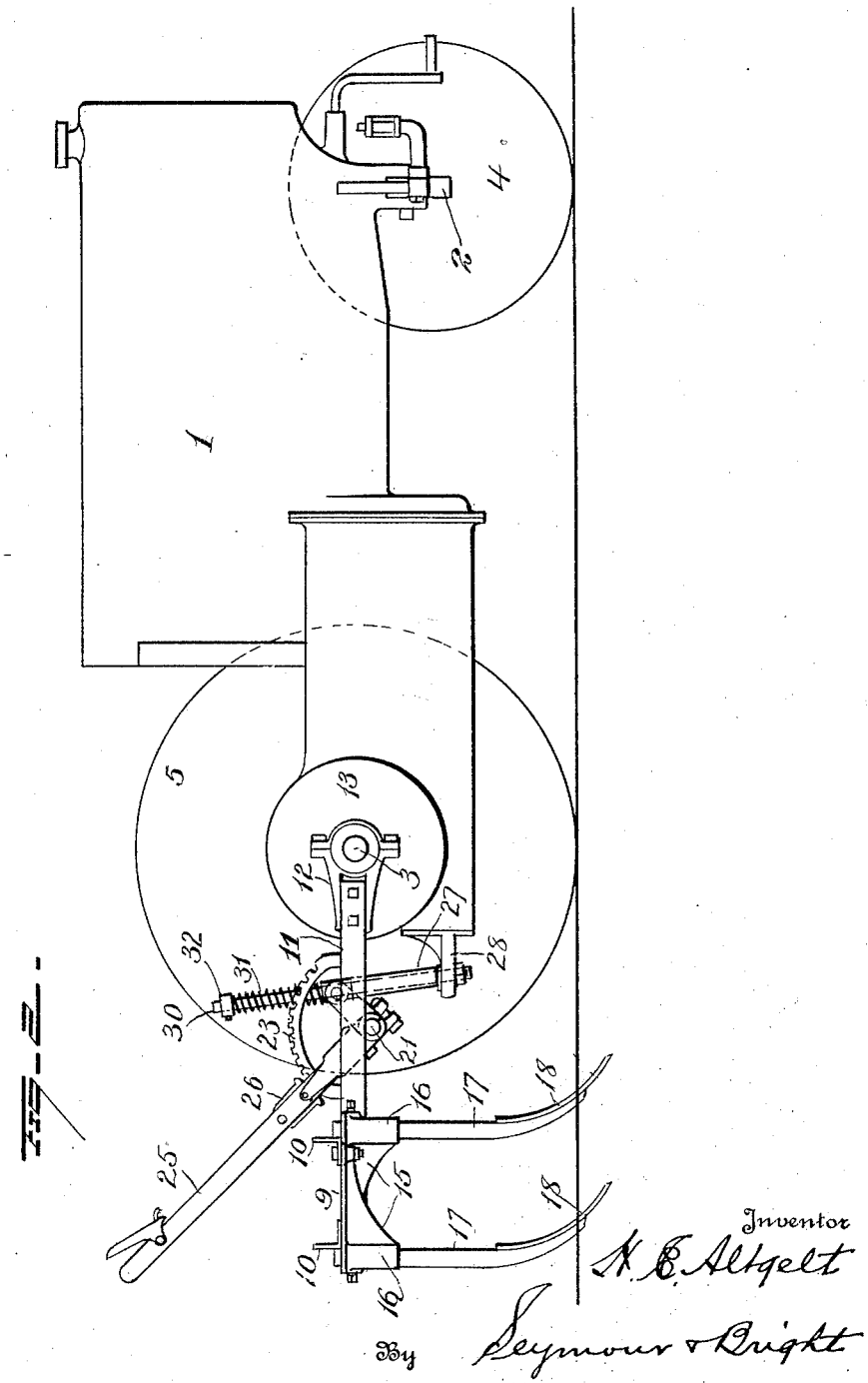

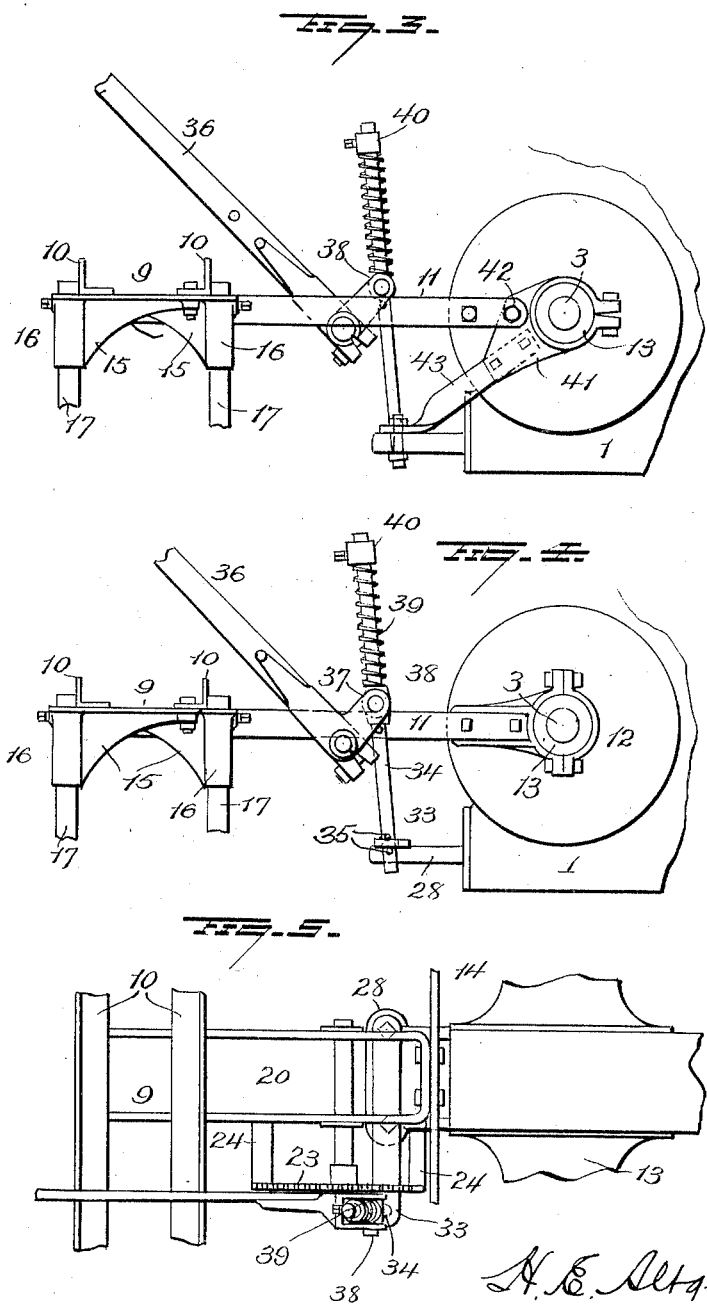

1,738,510

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

AGRICULTURAL IMPLEMENT

Original application filed June 17, 1927, Serial No. 199,535. Divided and this application filed February 3, 1928. Serial No. 251,640.

This invention relates to improvements in agricultural implements and more particularly to motor driven implements,—this application being a division of application for patent filed by me on the 17th day of June 1927, and designated by Serial No. 199,535.

One object of my present invention is to provide an improved attachment which shall be applicable to the rear portion of a tractor and embody soil-engaging elements located rearwardly of the rear axle of the tractor.

A further object is to provide simple and efficient means for raising, lowering and vertically adjusting soil-engaging or earth-working structure connected with the rear portion of a tractor.

With these and othe objects in view, the invention consists in certain novel features of construction and combination of parts as hereinafter set forth and pointed out in the claims.

In the accompanying drawings:

Figure 1 is a plan view showing the application of my improvements to a tractor;

Figure 2 is a view in side elevation;

Figure 3 is a view of a modification of the manner of connecting the attachment with the tractor, and Figures 4 and 5 are views showing a modification in the raising, lowering and vertically adjusting mechanism and the manner of connecting the same with the tractor.

A tractor of the Fordson type is indicated at 1, the front axle at 2 and the rear axle 3. In order that the wheels 4 and 5 of the tractor shall be sufficiently spaced apart to permit the cultivation of two rows of corn by means of the cultivating elements located as hereinafter described, said front and rear axles are made of greater length than the normal front and rear axles of a Fordson tractor. Portions of the steering gear for said wheels are shown at 6, 7 and 8, but as the particular construction of the steering gear forms no part of my present invention, further description of the same herein is deemed unnecessary. The rear axle end portions are made sufficiently long to permit the rear tractor wheels 5 to be spaced approximately the same distance apart as are the front wheels 4. The outwardly projecting rear axle portions may be grooved or made angular in cross section and the rear traction wheels may be moved inwardly or outwardly thereon so that they may be adjusted to different spaced positions and then secured in any suitable manner to the hubs of the traction wheels.

Rearwardly of the tractor, a transversely disposed frame 9 is located, the length of said frame being such that it will extend slightly beyond the vertical planes of the outer faces of the rear traction wheels 5 and comprises parallel angle beams 10 suitably spaced apart. The rear frame 9 is connected with the rear portion of the tractor through the medium of supporting members 11 secured at their rear ends to the respective parallel beams 10 of said rear frame and secured at their forward ends to bearings 12 loosely mounted on the rear axle housing 13 near respective ends of the latter. The supporting members are connected by a brace bar 14 located behind the axle housing 13. The beams 10 of the rear frame 9 are connected by horizontal brackets 15 and these brackets project beyond one beam 10 or the other. The projecting portions of the brackets 15 are so formed as to provide sleeves 16 for the accommodation of the shanks 17 of cultivator shovels 18 or other soil engaging members. The beams 10 of the rear frame 9 are provided each with numerous perforations 19 for accommodation of the bolts which secure the brackets to the rear frame, so that said brackets and therefore the rear soil engaging members may be adjusted relatively to each other. The arrangement of the rear shovels is such that at least one rear shovel will be behind each of the traction wheels 5, while one of the rear shovels will occupy a position in line with the longitudinal axis of the tractor.

The parallel members of a horizontally disposed U-shaped bracket 20 are secured at their rear ends to central portions of the rear frame members 10 and at its forward end, said bracket is secured to the brace 14 in rear of the central portion of the rear axle housing of the tractor. A shaft 21 extends across the parallel members of the U-shaped bracket 20 and projects laterally beyond one of said members,—suitable bearings 22 being provided on said members for said shaft. A toothed segment 23 is disposed laterally from the bracket 20 and connected with the latter by arms 24, and a hand lever 25 secured to the projecting end of the shaft 21 carries a suitable detent at 26 for cooperation of said segment. A vertically disposed tube 27 is secured to the draw-bar cap 28 at the rear end of the tractor and communicates with a hole in the latter and the upper end portion of said tube is pivotally connected with arms 29 projecting from the shaft 21. A rod or bar 30 extends through the vertical tube 27 and the draw bar cap 28 and is headed at its lower end under the latter. This rod or bar extends upwardly beyond the tube and receives a spring 31, the latter bearing at its respective ends against the upper end of the tube 27 and a collar or abutment 32 adjustably secured to the upper portion of said rod or bar.

With the construction above described, the frames carrying the engaging devices may yield against the resistance of the spring means.

When the hand lever 25 is moved forwardly from the position shown in Fig. 2, a downward pressure will be applied, through the medium of the tube 27 to the draw-bar cap of the tractor and the rear cultivator frame 9 will be raised, to either raise the rear cultivator elements out of the ground or to adjust them to regulate their depth of penetration. It will be apparent that when the hand lever 25 is moved to cause the raising or lowering of the rear cultivator frame, said frame will swing on its connection with the rear axle housing of the tractor.

In the construction of lifting mechanism for raising and lowering the rear shovel frame, shown in Figs. 4 and 5, a horizontal bar 33 is secured to the draw-bar cap or clevis 28 and projects laterally beyond the same in one direction. The sleeve 27 hereinbefore described is dispensed with and the rod 34 is passed through the free end portion of said horizontal bar, pins 35 being passed transversely through said rod over and under said bar. In this construction the hand lever 36 is provided with a bifurcated arm 37 pivotally connected with a collar or sleeve 38 on the rod 34, the spring 39 on said rod bearing at one end against said collar or sleeve and at the other end against an abutment 40.

Instead of connecting the supporting members for the rear cultivator frame with bearing members loosely mounted on the rear axle housing as previously explained, brackets 41 may be clamped to said housing near respective ends thereof and the support members 11 pivotally connected thereto, as at 42 Fig. 3, each of said brackets being connected with the draw-bar cap of the tractor through the medium of a brace 43.

Having fully described my invention what I claim as new and desire to secure by Letters-Patent, is:—

1. The combination with a tractor, of a rear tool-carrying frame having pivotal connection with the tractor, and hand-operated means supported by said tool-carrying frame and connected with a fixed part of the tractor to exert pressure thereon for raising and lowering said tool-carrying frame.

2. The combination with a tractor, of a rear tool-carrying frame having pivotal connection with the tractor, a hand lever supported by said frame, a connection between said lever and a fixed part of the tractor and exerting pressure thereon whereby said frame may be raised or lowered when said lever is operated, and spring means cooperable with said connection, whereby said frame may yield against the resistance of said spring means.

3. The combination with a tractor, of a transversely disposed frame located rearwardly of the tractor, supports for said frame projecting forwardly therefrom intermediate the ends thereof, means effecting pivotal connection of said supports with the rear axle housing of the tractor, soil-engaging elements carried by said frame, and manually operable means between said frame and the tractor and exerting pressure on the tractor for raising and lowering said frame.

4. The combination with a tractor, of a transversely disposed frame behind the tractor, soil-engaging elements carried by said frame, supporting means secured to and projecting forwardly from said frame and intermediate the ends thereof having pivotal connection with the tractor, a hand lever, means rigid with said frame for supporting said lever, and a connection between said lever and a fixed part of the tractor and exerting pressure on said fixed part to effect the raising and lowering of said frame.

5. The combination with a tractor, of a transversely disposed frame located in rear of the tractor, soil-engaging elements carried by said frame, supports secured to and projecting forwardly from said frame intermediate the ends thereof and having pivotal connection with the tractor, a brace connecting said supports, a bracket between said brace and frame, a shaft supported by said bracket, an arm on said shaft, a connection between said arm and a fixed part of the tractor, a hand lever secured to said shaft, and means for locking said lever.

6. The combination with a tractor, of a transversely disposed frame in rear of the tractor, soil engaging elements carried by said frame, supports secured to said frame and having pivotal connection with the tractor, a bracket secured to said frame and projecting therefrom, a shaft supported by said bracket, a hand lever secured to said shaft, an arm on said shaft, an upright tube carried by a fixed part of the tractor and pivotally connected with the arm on said shaft, a rod passing through said tube and having a headed lower end, said rod extending upwardly beyond said tube, an abutment near the upper end of said rod, and a spring on said rod between said abutment and the upper end of said tube.

In testimony whereof, I have signed this specification.

HERMAN E. ALTGELT.